United States Patent
Srinivasan et al.

(10) Patent No.: US 10,235,180 B2
(45) Date of Patent: Mar. 19, 2019

(54) SCHEDULER IMPLEMENTING DEPENDENCY MATRIX HAVING RESTRICTED ENTRIES

(71) Applicants: Srikanth T. Srinivasan, Portland, OR (US); Matthew C. Merten, Hillsboro, OR (US); Bambang Sutanto, Hillsboro, OR (US); Rahul R. Kulkarni, Portland, OR (US); Justin M. Deinlein, Portland, OR (US); James D. Hadley, Portland, OR (US)

(72) Inventors: Srikanth T. Srinivasan, Portland, OR (US); Matthew C. Merten, Hillsboro, OR (US); Bambang Sutanto, Hillsboro, OR (US); Rahul R. Kulkarni, Portland, OR (US); Justin M. Deinlein, Portland, OR (US); James D. Hadley, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1116 days.

(21) Appl. No.: 13/723,684

(22) Filed: Dec. 21, 2012

(65) Prior Publication Data
US 2014/0181476 A1 Jun. 26, 2014

(51) Int. Cl.
*G06F 9/30* (2018.01)
*G06F 9/38* (2018.01)

(52) U.S. Cl.
CPC ................... *G06F 9/3838* (2013.01)

(58) Field of Classification Search
None
See application file for complete search history.

(56) References Cited

U.S. PATENT DOCUMENTS 6,334,182 B2 * 12/2001 Merchant et al. ............ 712/214

OTHER PUBLICATIONS

Sassone et al.; Matrix Scheduler Reloaded; 2007; ACM.*
Safi et al.; A Physical-Level Study of the Compacted Matrix Instruction Scheduler for Dynamically-Scheduled Superscalar Processors; 2009; IEEE.*

* cited by examiner

*Primary Examiner* — Corey S Faherty
(74) *Attorney, Agent, or Firm* — Lowenstein Sandler LLP

(57) ABSTRACT

A scheduler implementing a dependency matrix having restricted entries is disclosed. A processing device of the disclosure includes a decode unit to decode an instruction and a scheduler communicably coupled to the decode unit. In one embodiment, the scheduler is configured to receive the decoded instruction, determine that the decoded instruction qualifies for allocation as a restricted reservation station (RS) entry type in a dependency matrix maintained by the scheduler, identify RS entries in the dependency matrix that are free for allocation, allocate one of the identified free RS entries with information of the decoded instruction in the dependency matrix, and update a row of the dependency matrix corresponding to the claimed RS entry with source dependency information of the decoded instruction.

7 Claims, 5 Drawing Sheets

SCHEDULER IMPLEMENTING DEPENDENCY MATRIX HAVING RESTRICTED ENTRIES

TECHNICAL FIELD

The embodiments of the disclosure relate generally to processing devices and, more specifically, relate to a scheduler implementing a dependency matrix having restricted entries.

BACKGROUND

Generally, a processing device core may include, but is not limited to, a Front-End Pipeline (FEP) and an Execution Engine (EE). The FEP may retrieve instructions from memory, decode the instructions, and buffer them for downstream stages. The EE may then dynamically schedule and dispatch the decoded instructions to execution units for execution. The EE may include a variety of components, one of which is the scheduler. The scheduler is the EE component that queues micro-ops (μop) until all source operands of the μop are ready. In addition, the scheduler schedules and dispatches ready μops to available execution units of the EE.

To improve performance, some processors execute instructions in parallel. To execute different portions of a single program in parallel, a scheduler may schedule some instructions for execution out of their original order. Generally, μops wait at the scheduler until they are ready for execution. The process of waking up and scheduling a μop that is waiting for valid source data can be timing critical. As the depth of the scheduler increases (e.g., for performance reasons), the number of μops waiting in a scheduler may increase and, as a result, it may become more difficult to wake up and schedule a μop in a single cycle, or a limit may have to be placed on the number of μops that may wait for valid source data at the scheduler.

The scheduler may utilize a Reservation Station (RS) as a buffer to queue μops until all source operands are ready. The size of the RS is limited based on space and timing pressures of the architecture of the processing device. The RS has a timing-critical loop, called the Ready/Schedule Loop. This Ready/Schedule Loop is frequently implemented as two matrices, a Ready Matrix and a Schedule Matrix. The Ready Matrix (also known as a dependency matrix, Wakeup Matrix, or Execution Unit Matrix) tracks the availability of the source operands of each μop buffered in the RS. The Schedule Matrix selects from among the μops that are indicated as ready (e.g., source operands are ready as determined by the ready matrix) to schedule to the execution units.

The Ready Matrix has one row and one column for each μop in the RS. If entry (i, j) in the Ready matrix is set to 1, then the μop belonging to row i is dependent on the μop belonging to column j (i.e., one of the sources of the μop belonging to row i is produced by the μop belonging to column j). Thus, a row in the Ready Matrix may have multiple bits sets, depending on the number of sources for the μop and if the producers of these sources are still in the RS.

When a particular source is available, the bit corresponding to that source is reset to 0. When all the sources of a particular μop are available, then this μop is ready to schedule. This ready determination for a particular row in the Ready Matrix involves OR-ing the column bits for that row to check if all the bits have been reset to 0.

If the number of RS entries is increased, then both the number of rows and the number of columns in the Ready Matrix increase as well. As a result, a ready determination for a row could take more time (more gates may have to be added or the number of inputs per gate may have to be increased for the OR-ing logic). Moreover, adding more columns to the Ready Matrix increases the x-dimension of the Ready Matrix, which causes the ready signal to travel farther to reach the Schedule Matrix (which is the consumer of the ready signal), further adding to the timing pressure on the scheduler.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
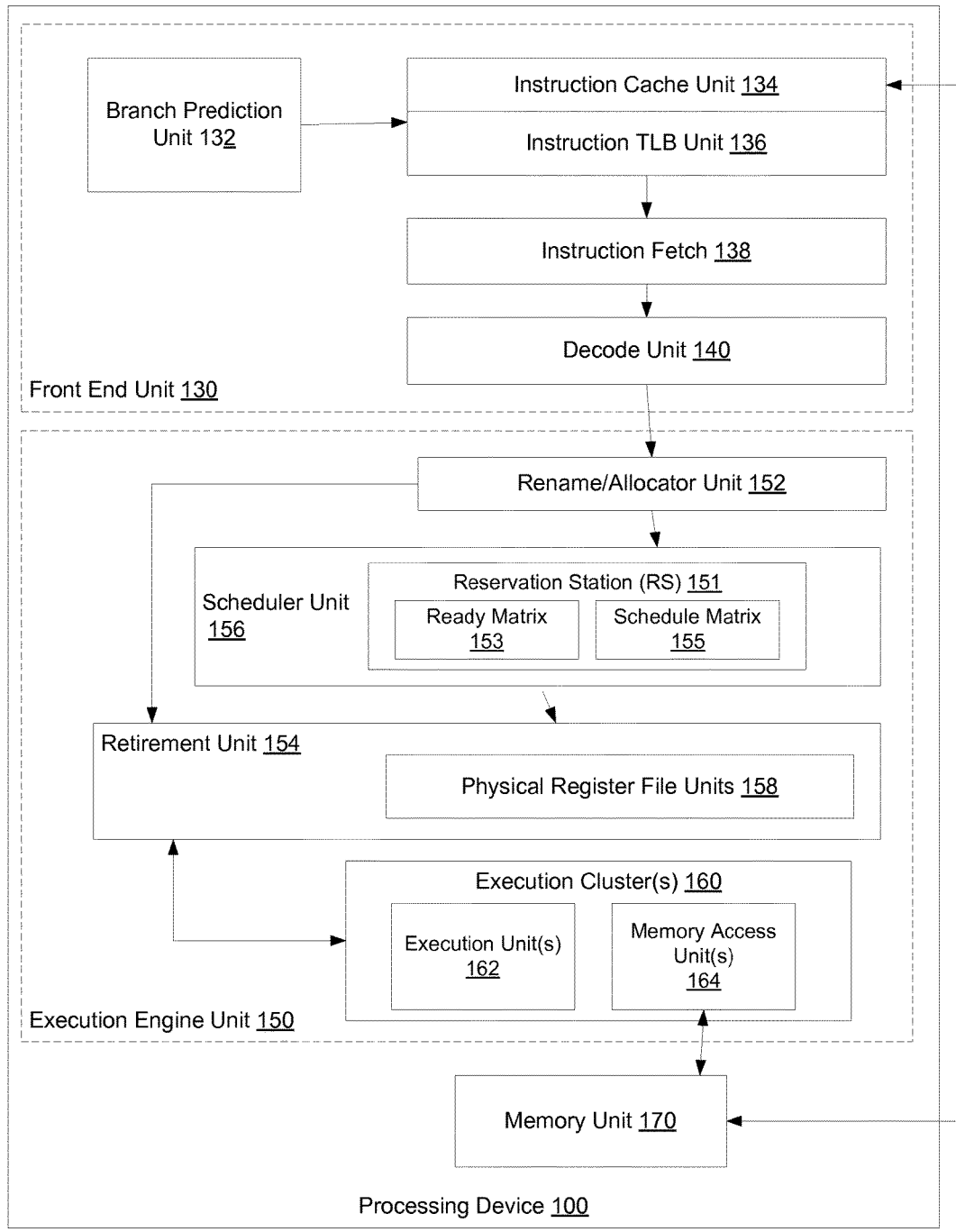
FIG. 1 is a block diagram of a micro-architecture for a processor that includes a scheduler implementing a dependency matrix having restricted entries in accordance with one embodiment of the disclosure.

Embodiments of the disclosure provide for a scheduler implementing a dependency matrix having restricted entries. In one embodiment, the implementation of the dependency matrix with restricted entries by the scheduler of the processor addresses the problem of increased area and timing pressure that results from the addition of more entries to the reservation station (RS) of the scheduler. The restricted RS entries may be used by micro instructions (μops) waiting at the scheduler that do not have to wake up any other μops in a dependency matrix (e.g., Ready Matrix) of the RS. For example, such instructions may include store instructions, branch instructions, and load instructions. In one embodiment, the restricted RS entries include a row in the dependency matrix, but have no corresponding column in the dependency matrix. As a result, an RS with restricted RS entries encompasses less area and timing demands than an RS with all general RS entries in the dependency matrix.

In one embodiment, a processing device of the disclosure includes a decode unit to decode an instruction and a scheduler communicably coupled to the decode unit. The scheduler may be configured to receive the decoded instruction and determine that the decoded instruction qualifies for allocation as a restricted reservation station (RS) entry type in a dependency matrix maintained by the scheduler. The scheduler may also be configured to identify RS entries in the dependency matrix that are free for allocation, allocating one of the identified free RS entries with information of the decoded instruction in the dependency matrix, and update a row of the dependency matrix corresponding to the claimed RS entry with source dependency information of the decoded instruction.

Although the following embodiments may be described with reference to specific integrated circuits, such as in computing platforms or microprocessors, other embodiments are applicable to other types of integrated circuits and logic devices. Similar techniques and teachings of embodiments described herein may be applied to other types of circuits or semiconductor devices. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below.

Although the following embodiments are described with reference to a processor, other embodiments are applicable to other types of integrated circuits and logic devices. Similar techniques and teachings of embodiments of the present invention can be applied to other types of circuits or semiconductor devices that can benefit from higher pipeline throughput and improved performance. The teachings of embodiments of the present invention are applicable to any processor or machine that performs data manipulations. However, the present invention is not limited to processors or machines that perform 512 bit, 256 bit, 128 bit, 64 bit, 32 bit, or 16 bit data operations and can be applied to any processor and machine in which manipulation or management of data is performed. In addition, the following description provides examples, and the accompanying drawings show various examples for the purposes of illustration. However, these examples should not be construed in a limiting sense as they are merely intended to provide examples of embodiments of the present invention rather than to provide an exhaustive list of all possible implementations of embodiments of the present invention.

As more computer systems are used in internet, text, and multimedia applications, additional processor support has been introduced over time. In one embodiment, an instruction set may be associated with one or more computer architectures, including data types, instructions, register architecture, addressing modes, memory architecture, interrupt and exception handling, and external input and output (I/O).

In one embodiment, the instruction set architecture (ISA) may be implemented by one or more micro-architectures, which includes processor logic and circuits used to implement one or more instruction sets. Accordingly, processors with different micro-architectures can share at least a portion of a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a Register Alias Table (RAT), a Reorder Buffer (ROB) and a retirement register file. In one embodiment, registers may include one or more registers, register architectures, register files, or other register sets that may or may not be addressable by a software programmer.

In one embodiment, an instruction may include one or more instruction formats. In one embodiment, an instruction format may indicate various fields (number of bits, location of bits, etc.) to specify, among other things, the operation to be performed and the operand(s) on which that operation is to be performed. Some instruction formats may be further broken defined by instruction templates (or sub formats). For example, the instruction templates of a given instruction format may be defined to have different subsets of the instruction format's fields and/or defined to have a given field interpreted differently. In one embodiment, an instruction is expressed using an instruction format (and, if defined, in a given one of the instruction templates of that instruction format) and specifies or indicates the operation and the operands upon which the operation will operate.

In one embodiment, destination and source registers/data are generic terms to represent the source and destination of the corresponding data or operation. In some embodiments, they may be implemented by registers, memory, or other storage areas having other names or functions than those depicted. For example, in one embodiment, "DEST1" may be a temporary storage register or other storage area, whereas "SRC1" and "SRC2" may be a first and second source storage register or other storage area, and so forth. In other embodiments, two or more of the SRC and DEST storage areas may correspond to different data storage elements within the same storage area (e.g., a SIMD register). In one embodiment, one of the source registers may also act as a destination register by, for example, writing back the result of an operation performed on the first and second source data to one of the two source registers serving as a destination registers.

FIG. 1 is a block diagram of a micro-architecture for a processor 100 that includes a scheduler implementing a dependency matrix having restricted entries in accordance with one embodiment of the disclosure. Specifically, processor 100 depicts an in-order architecture core and a register renaming logic, out-of-order issue/execution logic to be included in a processor according to at least one embodiment of the invention.

Processor 100 includes a front end unit 130 coupled to an execution engine unit 150, and both are coupled to a memory unit 170. The processor 100 may include a reduced instruction set computing (RISC) core, a complex instruction set computing (CISC) core, a very long instruction word (VLIW) core, or a hybrid or alternative core type. As yet another option, processor 100 may include a special-purpose core, such as, for example, a network or communication core, compression engine, graphics core, or the like.

The front end unit 130 includes a branch prediction unit 132 coupled to an instruction cache unit 134, which is coupled to an instruction translation lookaside buffer (TLB) 136, which is coupled to an instruction fetch unit 138, which is coupled to a decode unit 140. The decode unit 140 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 134 is further coupled to the memory unit 170. The decode unit 140 is coupled to a rename/allocator unit 152 in the execution engine unit 150.

The execution engine unit 150 includes the rename/allocator unit 152 coupled to a retirement unit 154 and a set of one or more scheduler unit(s) 156. The scheduler unit(s) 156 represents any number of different schedulers, including reservations stations (RS), central instruction window, etc. The scheduler unit(s) 156 may utilize a Reservation Station (RS) 151 as a buffer to queue μops until all source operands are ready. The RS 151 has a timing-critical loop, called the Ready/Schedule Loop. This Ready/Schedule Loop is frequently implemented as two matrices, a Ready Matrix 153 (also known as a dependency matrix) and a Schedule Matrix 155. The Ready Matrix 153 tracks the availability of the source operands of each μop buffered in the RS. The Schedule Matrix 155 selects from among the μops that are indicated as ready (e.g., source operands are ready as determined by the ready matrix) to schedule to the execution units. As will be discussed further below with reference to FIGS. 2-4, the RS 151 of embodiments of the disclosure may include additional restricted RS entries without increasing the number of columns in the Ready Matrix 153.

The scheduler unit(s) 156 is coupled to the physical register file(s) unit(s) 158. Each of the physical register file(s) units 158 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 158 is overlapped by the retirement unit 154 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 154 and the physical register file(s) unit(s) 158 are coupled to the execution cluster(s) 160. The execution cluster(s) 160 includes a set of one or more execution units 162 and a set of one or more memory access units 164. The execution units 462 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 156, physical register file(s) unit(s) 158, and execution cluster(s) 160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 164). It should also be understood that where separate pipelines are used, one or more of these pipelines may be out-of-order issue/execution and the rest in-order.

The set of memory access units 164 is coupled to the memory unit 170, which may include a data TLB unit (not shown), a data cache unit (not shown), and a level 2 (L2) cache unit (not shown), to name a few examples. In one exemplary embodiment, the memory access units 164 may include a load unit, a store address unit, and a store data unit, each of which is coupled to the data TLB unit in the memory unit 470. The L2 cache unit is coupled to one or more other levels of cache and eventually to a main memory.

The processor 100 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 2:
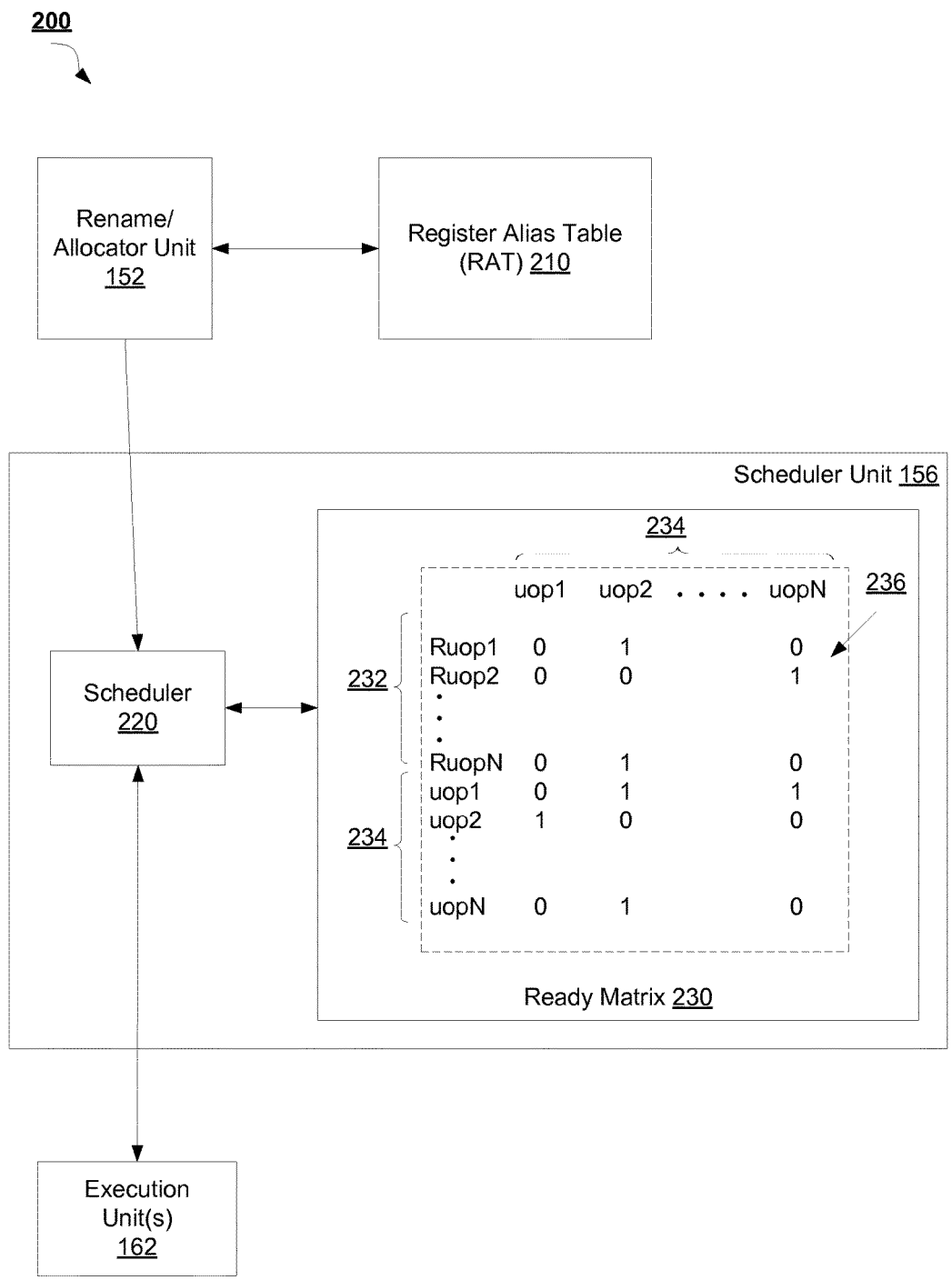
FIG. 2 is a block diagram illustrating a processor core implementing a scheduler unit implementing a dependency matrix having restricted entries according to an embodiment of the disclosure.

FIG. 2 is a block diagram illustrating a processor core 200 implementing a scheduler unit 156 with a dependency matrix having restricted entries according to an embodiment of the disclosure. In one embodiment, the scheduler unit 156 is the same as scheduler unit 156 described with respect to FIG. 1. The scheduler unit 156 may include a scheduler 220 that receives decoded instructions from a rename/allocator unit 152 and schedules them for execution by the execution unit(s) 162. In one embodiment, rename/allocator unit 152 and execution unit(s) 162 are the same as their counterparts described with respect to FIG. 1. The rename/allocator unit 152 may be coupled to register alias table (RAT) 210, for example, to map logical (or architectural) registers (such as those identified by operands of software instructions) to corresponding physical registers. This may allow for dynamic expansion of general use registers to use available physical registers. In one embodiment, the rename/allocation unit 152 may initially provide, based on reference to RAT 210, values for the source IDs of the source operands of a μop to the scheduler 220 when the μop is allocated into the scheduler unit 156.

The scheduler 220 may be coupled to a Ready Matrix 230. In one embodiment, Ready Matrix 230 is the same as Ready Matrix 153 described with respect to FIG. 1. Ready Matrix may be part of a RS implemented by the scheduler unit 156. The Ready Matrix 153 may be stored in memory, such as memory unit 170 of FIG. 1.

In one embodiment, the Ready Matrix 230 has one row and one column for each μop 234 allocated to the RS. If an entry 236 (i, j) in the Ready Matrix 230 is set to 1, then the μop belonging to row i is dependent on the μop belonging to column j (i.e., one of the sources of the μop belonging to row i is produced by the μop belonging to column j). Thus, a row in the Ready Matrix 230 may have multiple bits sets, depending on the number of sources for the μop and if the producers of these sources are still in the RS.

When a particular source is available, the bit corresponding to that source is reset to 0. When all the sources of a particular μop are available, then this μop is ready to schedule according to the dependency matrix. Note that there may be other factors in determining readiness to schedule beyond the dependency matrix that are not part of embodiments of the disclosure. This ready determination for a particular row in the Ready Matrix 230 involves OR-ing each of the column bits for that row to check if the bits have been reset to 0.

In embodiments of the disclosure, the RS of scheduler unit 156 also includes a plurality of restricted entries 232. A restricted entry 232 corresponds to a μop that does not wakeup a dependent μop using the Ready Matrix 230. Examples of a μop that would qualify for a restricted entry in the RS include Store Address μops (STAs), Store Data μops (STDs), branches and loads. Stores and branches do not have any dependents, while loads use a Load Matrix to wakeup dependents. Because restricted entries in the RS do not have any dependent μops to wakeup, these restricted entries do not have a corresponding column in the Ready Matrix 230. As a result, additional restricted entries may be added to the RS without increasing column space (x-dimension) in the Ready Matrix 230.

In some embodiments, a restricted RS entry may correspond to a column of the Ready Matrix 230. In this case, the RS is constructed such that restricted RS entries use a column but not a row.

By not adding additional columns in the Ready Matrix 230, the addition of extra gate logic in ready signal calculation logic can be avoided, thereby reducing the impact on the one-cycle loop timing path. Furthermore, as the x-dimension of the Ready matrix is not increased, this avoids the Ready signal having to travel farther to reach the Schedule Matrix 155 and hence avoids negatively impacting the timing pressure.

Embodiments of the disclosure also provide a restricted RS entry allocation scheme. In one embodiment, the allocator unit 152 is responsible for allocating μops to the RS, and more specifically, to the restricted RS entries of the scheduler unit 156. For purposes of the following description of embodiments of the restricted RS entry allocation scheme, assume the RS of scheduler unit 156 includes 6 additional restricted RS entries. Furthermore, assume that 4 μops come from the rename/allocator unit 152 for allotment in the RS each cycle (i.e., 4 write ports to the RS).

The restricted RS entries allocation scheme may follow two general parameters when implemented. The first parameter is that the restricted RS entries may obey the same rules as the general RS entries in order to have the same number of ports in each part of the RS. The second parameter involves fused μops. A fused μop may include two or more μops (e.g., memory write operations and/or read-modify operations) that previously were separate operations to be executed by two or more different execution units, but are brought together as a single μop through most of the processor pipeline and include a single entry in a reorder buffer (ROB) of the processor. The MEM and OP portions of a fused μop may allocated to the same bundles of the RS. This reduces the number of write ports to the restricted RS entry by allowing the fused and unfused portion of a μop to share write ports where data is identical.

In some embodiments, the restricted RS entry placement logic combines with the general RS entry search bundling scheme. For example, the RS entry allocation scheme may execute the search for the restricted entries in parallel with the general RS entry search. If a slot can claim both a restricted entry and a general entry, the restricted entry may take precedent. In other words, after both searches are complete, if a restricted entry is available and meets the requirements of the μop (that is, it does not have a dependent μop to wake up), that entry is claimed and the general entry is not claimed and remains in the free entry pool for the next cycle.

In other embodiments, a restricted RS entry search may be performed first, followed by a general RS entry search, if time permits. This provides for increased performance as more general RS entries may be left available for future use.

In one embodiment, the restricted RS entry search algorithm uses a slot-based scheme. In this slot-based scheme, there may be limits on which allocation slots can write to which RS entries. Furthermore, in some embodiments, available restricted RS entries are assigned to each allocation slot according to a priority.

Table 1 below shows one embodiment of a priority search scheme for restricted RS entries during allotment. Priorities 0, 1, 2, 3 are shown as four columns. In priority 0, slot0 receives first chance to claim entry R3 and slot1 receives first chance to claim R2. In priority 1, slot0 and slot1 receive first chance to claim entries R0 and R4 respectively, given that they had not previously claimed an entry in priority 0. Slot 2 and slot 3 are able to claim entries R2 and R3 respectively only if slot 0 and slot 1 did not already claim the entries in priority 0. This is then repeated until each slot is given a chance to examine 3 of the 6 restricted entries.

TABLE 1

(Restricted RS Search Priority)

| | Priority | | | |
|---|---|---|---|---|
| | 0 | 1 | 2 | 3 |
| Slot 0 (μop0) | R3 | R0 | R1 | |
| Slot 1 (μop1) | R2 | R4 | R0 | |
| Slot 2 (μop2) | | R2 | R5 | R1 |
| Slot 3 (μops3) | | R3 | R4 | R5 |

If the slot has an unfused μop, then the restricted RS entry won by the slot belongs to the single unfused μop. If a fused μop is being allocated to the RS, special features may apply for restricted RS entries. In one embodiment, once a slot has won a restricted RS entry, the two μops of a fused μop belonging to that slot compete for that restricted RS entry. If the slot has a fused LD-OP μop, then the restricted RS entry won by the slot belongs to the LD μop (but only if the OP portion is not eligible to acquire a restricted RS entry—i.e., for a fused LD-JMP, the restricted RS entry won by the slot will go to the JMP and not the LD).

In one embodiment, both a STA and STD operations are eligible for a restricted RS entry (as neither instruction writes back). However, in the case of a fused STA-STD μop, the restricted RS entry won by the slot may belong to the STD μop. Note that for STA-STD μops, the STD receives the restricted RS entry for performance reasons. This is because STDs live longer in the RS than STAs (on average), and, as a result, it is better to have more RS entries available for STDs compared to STAs.

Figure 3:
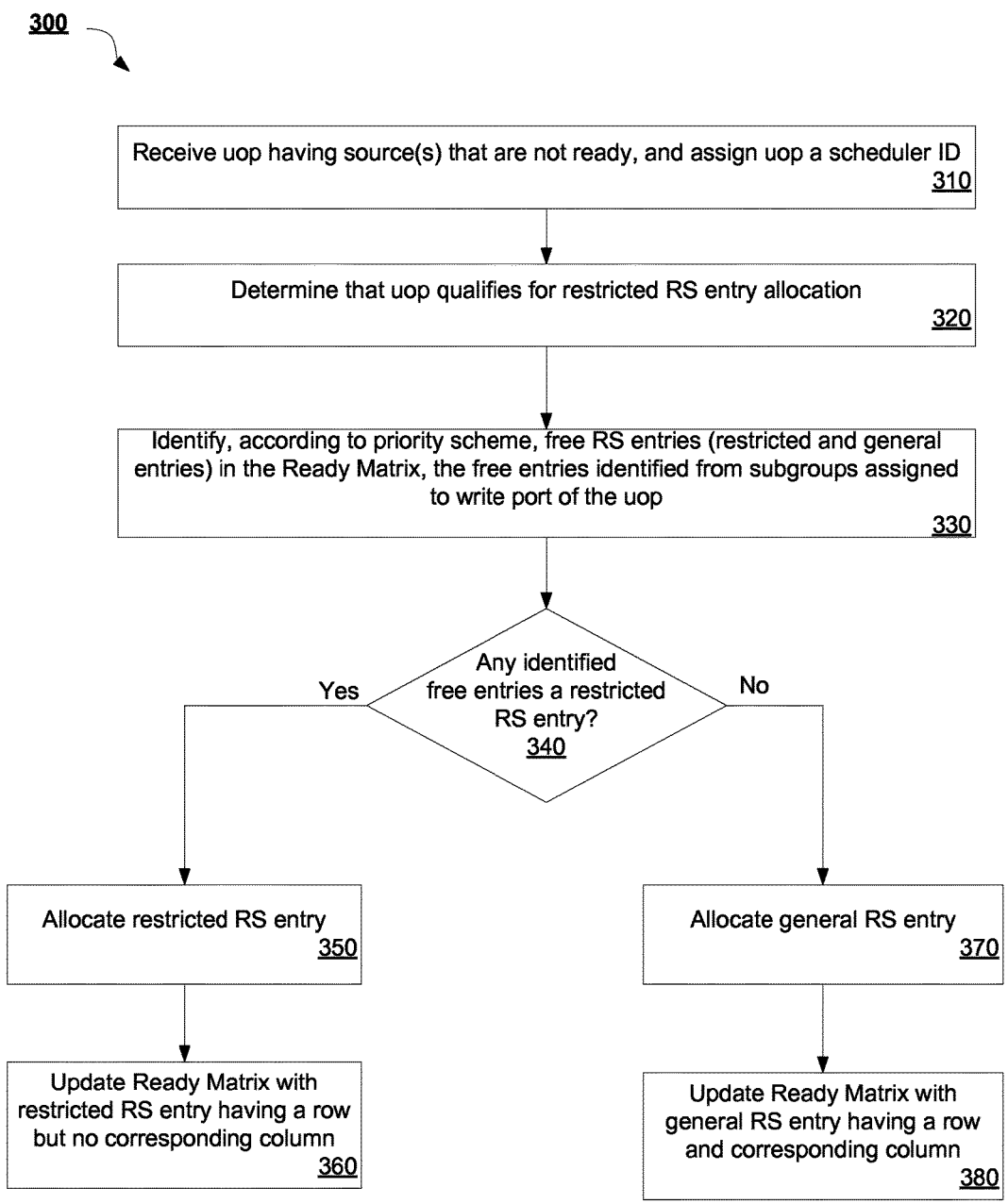
FIG. 3 is a flow diagram illustrating a method for implementing a dependency matrix with restricted entries according to an embodiment of the disclosure.

FIG. 3 is a flow diagram illustrating a method 300 for implementing an dependency matrix with restricted entries according to an embodiment of the disclosure. Method 300 may be performed by processing logic that may comprise hardware (e.g., circuitry, dedicated logic, programmable logic, microcode, etc.), software (such as instructions run on a processing device), firmware, or a combination thereof. In one embodiment, method 300 is performed by scheduler unit 156 of FIG. 1.

Method 300 begins at block 310 where the scheduler unit receives a μop having one or more sources that are not ready yet. In one embodiment, the μop is a decoded instruction received from a rename/allocator unit. Upon receipt, the μop may be assigned a μop scheduler ID for internal processing of the μop within the scheduler unit. Then, at block 320, the scheduler unit determines that the μop qualifies for allocation of a restricted RS entry. In one embodiment, the scheduler unit may determine that the μop is an instruction that is a type that does not have to wake up any dependents in a dependency matrix (e.g., Ready Matrix) of the scheduler unit. For example, the μop may be at least one of a store instruction, a load instruction, or a branch instruction, which qualify the μop as a restricted RS entry. In some embodiments, the μop is a fused μop and in such as case the fused μop is separated into its individual instructions to determine which one or both of the μop are eligible for a restricted RS entry per the above discussion.

At block 330, free RS entries in the dependency matrix are identified based on a priority scheme established for RS entry allocation. The free RS entries being searched for and identified may include both general RS entries and restricted RS entries. In one embodiment, a set of subgroups of RS entries is assigned to each slot (e.g., write port) coming from the rename/allocator unit. The scheduler unit may then, for each slot, search within the assigned set of subgroups for free entries in those subgroups to assign the μop associated with the slot. In some embodiments, the scheduler unit searches the set of subgroups for each slot using a predetermined priority ordering of the subgroups within the set. In one embodiment, a system administrator may establish and configure the priority ordering of subgroup searching for free RS entries.

Subsequently, at decision block 340, it is determined whether any of the identified free entries are a restricted RS entry. If so, method 300 proceeds to block 350 to allocate the restricted free RS entry. In one embodiment, if both a free restricted RS entry and a free general RS entry are located, the restricted RS entry takes precedent in terms of selection. In other embodiments, other factors may contribute to the selection of a restricted entry if available and usable, such as, but not limited to, a possible subgroup occupancy count and so on.

At block 360, the allocated restricted RS entry in the dependency matrix is updated with the μop dependency information. As discussed above, a restricted RS entry in the dependency matrix includes a row entry but no corresponding column entry. In other embodiment, if the restricted RS entry is set up as a column entry in the dependency matrix, then the restricted RS entry in the dependency matrix includes a column entry but no corresponding row entry. In either case, as a result, the dependency matrix is updated with source operand dependency information of the μop, but no other RS entries are updated to depend from the restricted RS entry.

On the other hand, if at decision block 340, the free entry is not a restricted RS entry (i.e., it is a general RS entry), then method 300 proceeds to block 370 where the free general RS entry is allocated. Then, at block 380, the allocated general RS entry in the dependency matrix is updated with the μop dependent information. In this case, the general RS entry in the dependency matrix includes both a row entry and a corresponding column entry. As such, the dependency matrix is updated with source operand dependency information of the μop, and other RS entries in the dependency matrix are updated to reflect any dependency on the newly-added μop.

Figure 4:
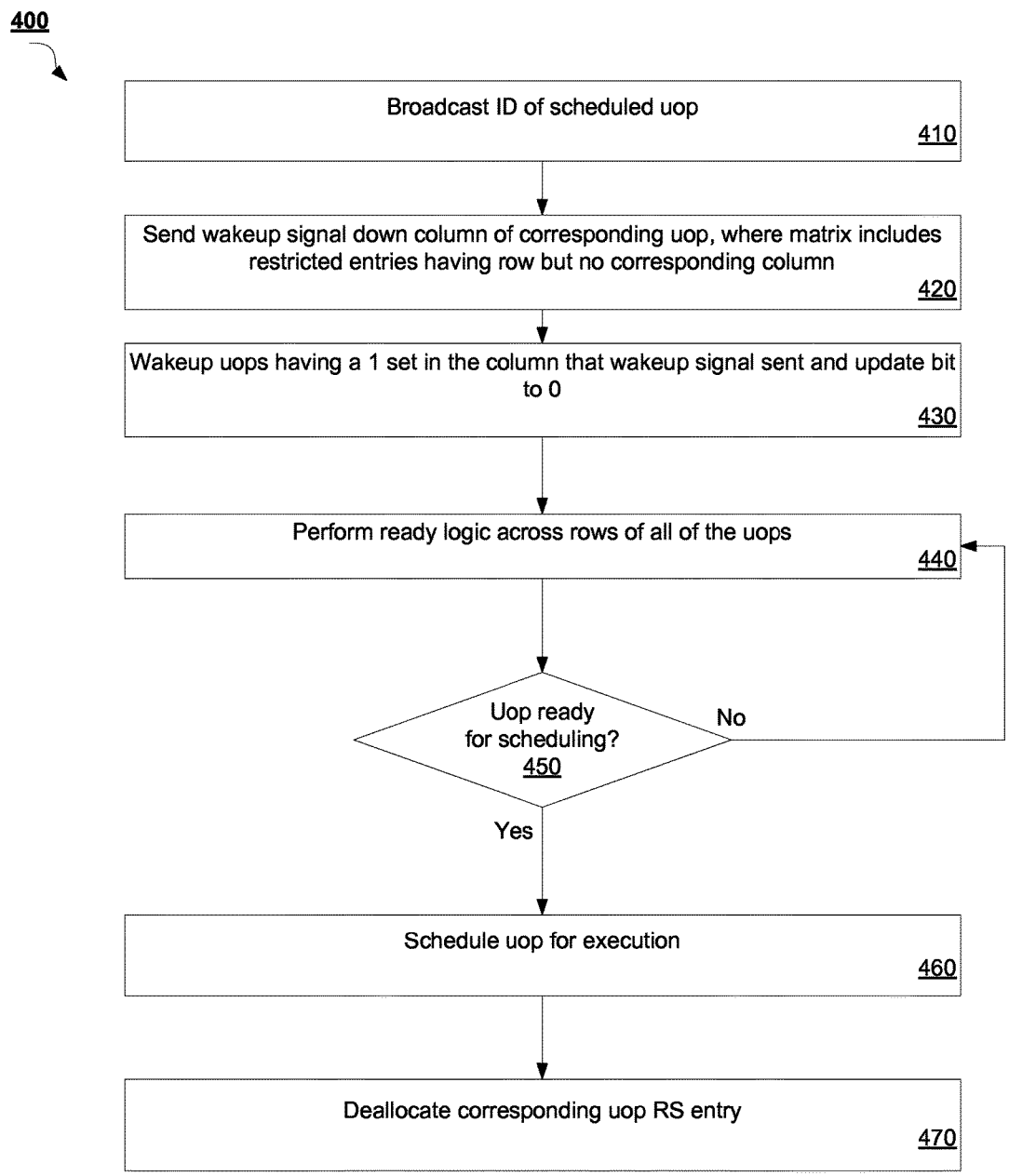
FIG. 4 is a flow diagram illustrating a method for updating a dependency matrix having restricted RS entries according to an embodiment of the disclosure.

FIG. 4 is a flow diagram illustrating a method 400 for updating a dependency matrix having restricted RS entries according to an embodiment of the disclosure. Method 400 may be performed by processing logic that may comprise hardware (e.g., circuitry, dedicated logic, programmable logic, microcode, etc.), software (such as instructions run on a processing device), firmware, or a combination thereof. In one embodiment, method 400 is performed by scheduler unit 156 of FIG. 1.

Method 400 begins at block 405 where the scheduler unit broadcasts an ID of a μop that was just scheduled by the scheduler unit. In one embodiment, the broadcasted ID is a decoded ID that include a one hot bit vector. The μop ID may be broadcasted to a dependency matrix (e.g., Ready Matrix) of a RS of the scheduler unit. At block 420, a wakeup signal is sent down the column in the dependency matrix associated with the μop corresponding to the broadcasted μop ID. In one embodiment, the dependency matrix includes one or more restricted RS entries that have row entries in the dependency matrix but no corresponding column entries. These restricted RS entries correspond to instructions that do not use the dependency matrix to wakeup dependent instructions, such as store instructions, branch instructions, and load instructions.

Then, at block 430, the μops having a 1 set in the column are awoken. At block 440, for each μop in the dependent matrix, ready logic is performed across the corresponding row of the μop in the dependency matrix. In one embodiment, the ready logic includes a set of gates that perform OR-ing across the entries in the row in the dependency matrix.

Subsequently, at decision block 450, it is determined whether the awoken μop is ready for scheduling based on the ready logic performed for the μop at block 440 (in addition to other ready information, such as port ready). In one embodiment, if the ready logic determines that all of the entries in the row are set to 0, then the ready logic returns a ready signal that indicates the μop is ready for scheduling. On the other hand, if the ready logic at block 440 determines that one or more of the entries are set of 1, then the ready logic returns a not ready signal.

If the μop is not ready for scheduling at decision block 450, then method 400 returns to block 440 to repeat the ready logic assessment. On the other hand, if the µop is ready for scheduling at decision block 450, the method 400 proceeds to block 460 where the µop is scheduled for execution by the scheduler unit. Then, at block 470, the corresponding RS entry for the µop is deallocated from the dependency matrix.

Figure 5:
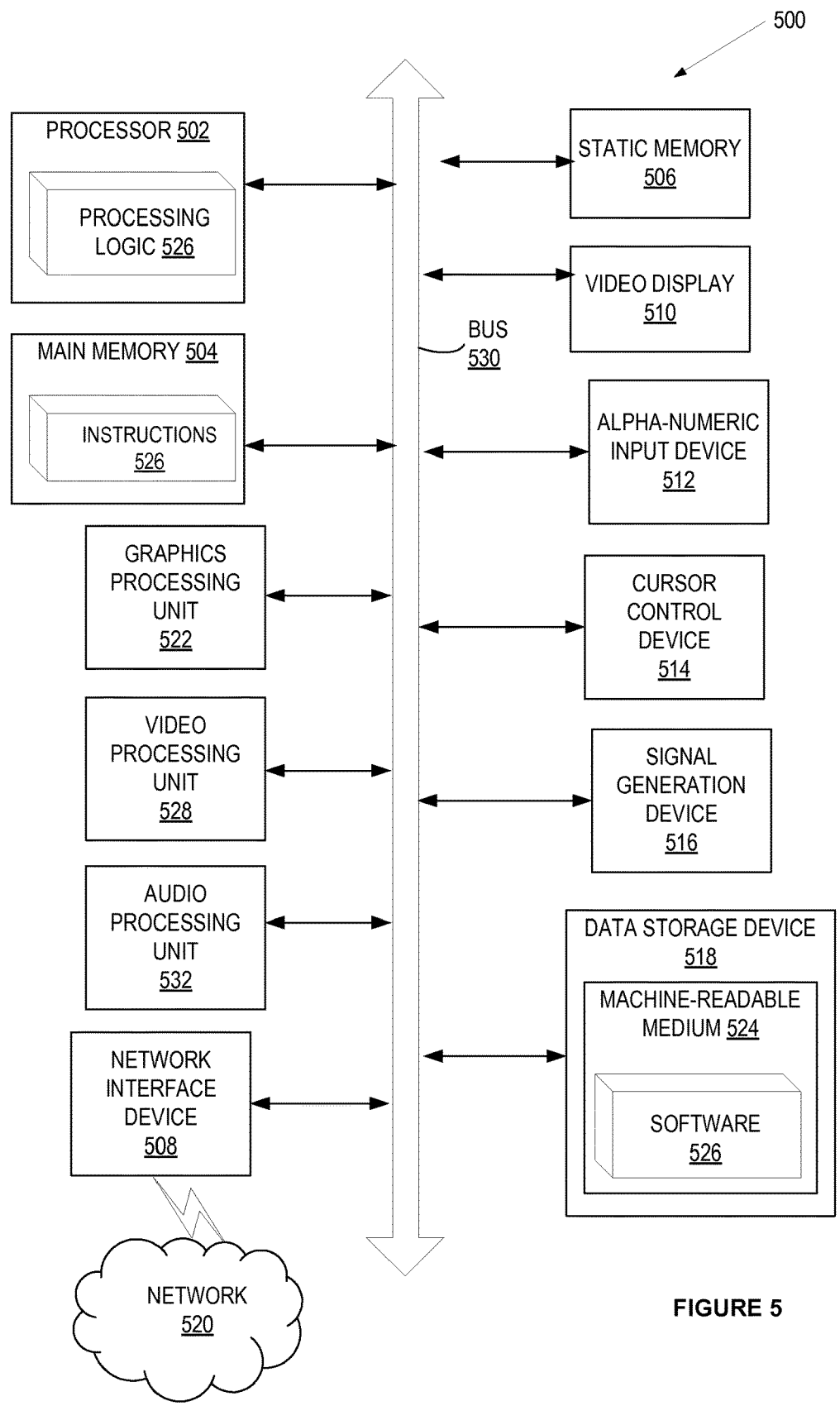
FIG. 5 illustrates a block diagram of one embodiment of a computer system.

FIG. 5 illustrates a diagrammatic representation of a machine in the example form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 500 includes a processing device 502, a main memory 504 (e.g., read-only memory (ROM), flash memory, dynamic random access memory (DRAM) (such as synchronous DRAM (SDRAM) or DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. In one embodiment, processing device 502 may include one or processing cores. The processing device 502 is configured to execute the processing logic 526 for performing the operations and steps discussed herein. In one embodiment, processing device 502 is the same as processing device 100 described with respect to FIG. 1 that implements a scheduler with a dependency matrix having restricted RS entries. For example, processing device 502 may include a scheduler unit implementing a dependency matrix with restricted RS entries, such as scheduler unit 156 of FIGS. 1 and 2.

The computer system 500 may further include a network interface device 508 communicably coupled to a network 520. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

Furthermore, computer system 500 may include a graphics processing unit 522, a video processing unit 528, and an audio processing unit 532.

The data storage device 518 may include a machine-accessible storage medium 524 on which is stored software 526 implementing any one or more of the methodologies of functions described herein, such as implementing an RS with restricted entries as described above. The software 526 may also reside, completely or at least partially, within the main memory 504 as instructions 526 and/or within the processing device 502 as processing logic 526 during execution thereof by the computer system 500; the main memory 504 and the processing device 502 also constituting machine-accessible storage media.

The machine-readable storage medium 524 may also be used to store instructions 526 implementing an RS of processor 502 that includes restricted entries, such as described with respect to processing device 100 in FIG. 1, and/or a software library containing methods that call the above applications. While the machine-accessible storage medium 528 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

While the disclosure has been described with respect to a limited number of embodiments, those skilled in the art will appreciate numerous modifications and variations there from. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the microcontroller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processing device comprising:
   a decode unit to decode an instruction;
   a scheduler communicably coupled to the decode unit, the scheduler to:
   receive the decoded instruction;
   determine that the decoded instruction qualifies as a restricted reservation station entry type in a dependency matrix maintained by the scheduler, wherein to qualify, the decoded instruction is restricted from having one or more dependent instructions in the dependency matrix;
   responsive to determining that the decoded instruction qualifies as the restricted reservation station entry type, allocate a restricted reservation station entry in the dependency matrix; and
   update the restricted reservation station entry in the dependency matrix with information from the decoded instruction, wherein the restricted reservation station entry comprising the information from the decoded instruction is prevented from being updated to reference a dependent instruction in the dependency matrix.

2. A computer-implemented method, comprising:
   receiving, by a scheduler of a processing device, a decoded instruction to be decoded by the processing device;
   determining, by the scheduler, that the decoded instruction qualifies as a restricted reservation station entry type in a dependency matrix maintained by the scheduler, wherein to qualify, the decoded instruction is restricted from having one or more dependent instructions in the dependency matrix;
   responsive to determining that the decoded instruction qualifies as the restricted reservation station entry type, allocating, by the scheduler, a restricted reservation station entry in the dependency matrix; and
   updating, by the scheduler, the restricted reservation station entry in the dependency matrix with information from the decoded instruction, wherein the restricted reservation station entry comprising the information from the decoded instruction is prevented from being updated to reference a dependent instruction in the dependency matrix.

3. The method of claim 2, wherein the decoded instruction is at least one of a store instruction, a load instruction, or a branch instruction.

4. A system, comprising:
   a memory to store a dependency matrix comprising entries indicative of a dependency status of a plurality of instructions, wherein the dependency matrix comprises one or more restricted entries having at least one of a row entry in the dependency matrix and without a corresponding column entry in the dependency matrix or a column entry in the dependency matrix and without a corresponding row entry in the dependency matrix; and
   a scheduler executed by a processing device communicably coupled to the memory, the scheduler to:
   broadcast an identifier (ID) of an instruction that is scheduled to one or more instructions awaiting scheduling and tracked by the scheduler using the dependency matrix;
   determine that the instruction qualifies as a restricted reservation station entry type in the dependency matrix, wherein to qualify, the decoded instruction is restricted from having one or more dependent instructions in the dependency matrix;
   responsive to determining that the decoded instruction qualifies as the restricted reservation station entry type, allocating a restricted reservation station entry in the dependency matrix; and
   update the restricted reservation station entry in the dependency matrix with information from the instruction, wherein the restricted reservation station entry comprising the information from the decoded instruction is prevented from being updated to reference a dependent instruction in the dependency matrix.

5. A non-transitory machine-readable storage medium including executable instructions that, when executed by a processing device, cause the processing device to:
   receive, by the processing device, a decoded instruction;
   determine that the decoded instruction qualifies as a restricted reservation station entry type in a dependency matrix maintained by a scheduler, wherein to qualify, the decoded instruction is restricted from having one or more dependent instructions in the dependency matrix;
   responsive to determining that the decoded instruction qualifies as the restricted reservation station entry type, allocate a restricted reservation station entry in the dependency matrix; and
   update the restricted reservation station entry in the dependency matrix with information from the decoded instruction, wherein the restricted reservation station entry comprising the information from the decoded instruction is prevented from being updated to reference a dependent instruction in the dependency matrix.

6. The processing device of claim 1, wherein the allocated restricted reservation station entry in the dependency matrix comprises at least one column in the dependency matrix without a corresponding row in the dependency matrix.

7. The processing device of claim 1, wherein the allocated restricted reservation station entry in the dependency matrix comprises a row in the dependency matrix without a corresponding column in the dependency matrix.

* * * * *